Jan. 26, 1932.    F. L. HAUSHALTER    1,842,607
HOOD CUSHION
Filed March 6, 1929
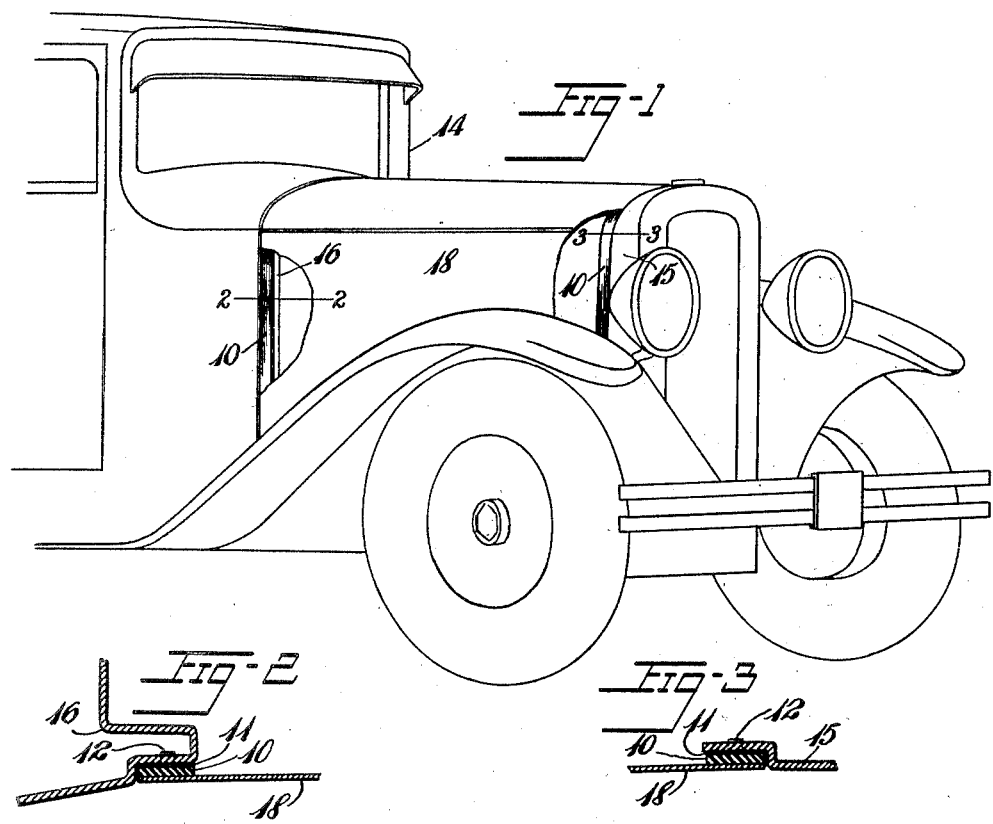
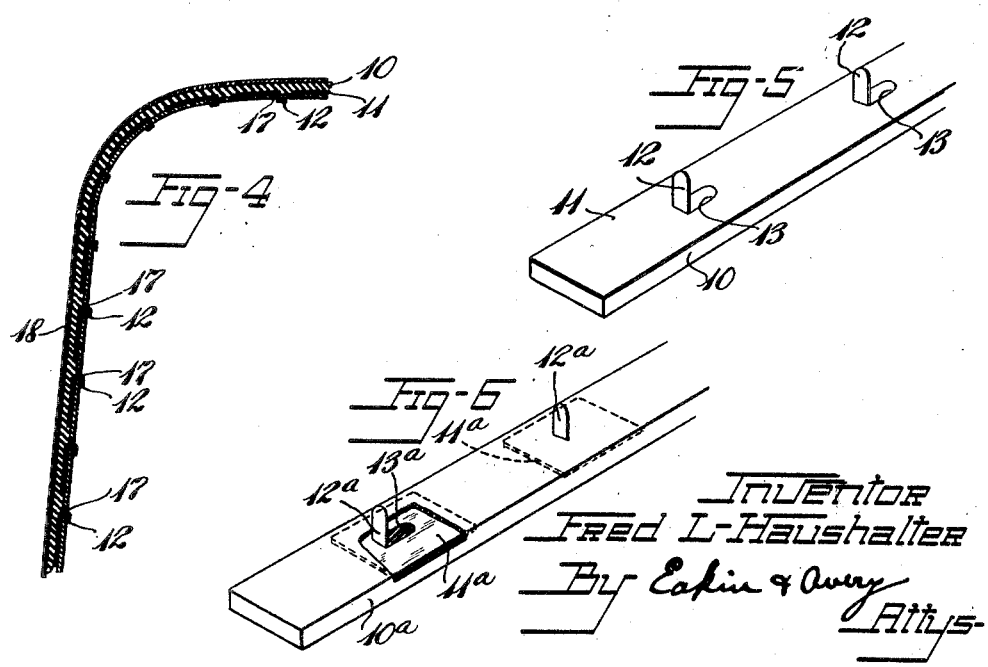

Patented Jan. 26, 1932

1,842,607

UNITED STATES PATENT OFFICE

FRED L. HAUSHALTER, OF AKRON, OHIO, ASSIGNOR TO THE B. F. GOODRICH COMPANY, OF NEW YORK, N. Y., A CORPORATION OF NEW YORK

HOOD CUSHION

Application filed March 6, 1929. Serial No. 344,685.

This invention relates to hood-cushions such as commonly are used on automobiles between the hood and radiator shell and between the hood and the cowl structure.

Hood-cushions of the character mentioned usually comprise raw-hide or the like interlaced in spaced apertures in the cowl or the radiator shell, or are made of heavy fabric secured in place by rivets passed through such apertures. The arrangement described requires considerable time and labor for mounting and removing the cushion or requires special tools for applying and removing rivets. Moreover, the rawhide or fabric cushions wear smooth in use and result in annoying squeaks when the hood rubs thereagainst during use.

The chief objects of my invention are to provide an improved hood-cushion for automobiles which will be easy to mount and remove; to provide a cushion that will not become so polished from use as to produce frictional squeaks; and to provide a cushion that will effect a water-tight seal in engagement with the hood.

Of the accompanying drawings:

Fig. 1 is a perspective view of the front end of an automobile, and my improved hood-cushion mounted thereupon, parts of the hood being broken away.

Fig. 2 is a section on line 2—2 of Fig. 1.

Fig. 3 is a section on line 3—3 of Fig. 1.

Fig. 4 is a longitudinal section through a portion of a hood-cushion and associated automobile structure.

Fig. 5 is a perspective view of one end of the preferred embodiment of my hood-cushion.

Fig. 6 is a perspective view of one end of a modified form of hood-cushion.

Referring to the preferred embodiment of my invention shown in Fig. 5 of the drawings, the cushion comprises a strip of resilient rubber composition 10 secured to a metal backing or reinforcing strip 11, preferably by vulcanization, said backing strip 11 being provided at determinate intervals throughout its length with outstanding tongues or lugs 12, 12 of metal, preferably integral with the strip 11. The strip 11 is made of some soft metal such as annealed brass or brass-plated iron to which the rubber composition 10 tightly adheres, and the lugs 12 may be struck out from the strip 11 so as to leave apertures 13, 13 therethrough, which apertures are filled with the rubber of the cushion 10.

In automobiles of standard design, such as the automobile 14, Fig. 1, the radiator shell 15 and cowling 16 are formed with spaced apertures 17, 17 (Fig. 4) and the hood-cushion is secured to the outer faces of said radiator shell and cowling structures respectively by means of the lugs 12 which are inserted in the respective apertures 17 therein and bent over or crimped onto the opposite side of the structure, as is clearly shown in Fig. 4. The hood 18 of the automobile rests upon the cushions 10 in the usual manner as shown.

My invention provides an improved and durable hood-cushion for automobiles which may be easily and quickly mounted and removed, and whereby the other objects set forth in the accompanying statement of objects are attained.

In the modified cushion strip shown in Fig. 6, the reinforcing structure comprises relatively short sections 11a, 11a of sheet metal of the same characteristics as the strip 11 employed in the preferred form, and each of said sections is formed with an upstanding lug 12a, the sections 11a being positioned in the cushion structure so that said lugs are registerable with the apertures 17 in the radiator shell or cowl of the automobile. The sections 11a are entirely covered with rubber, with the exception of their lugs 12a, the rubber cushion 10a extending through the apertures 13a of the sections to anchor the latter firmly to the cushion structure.

Other modifications may be resorted to within the scope of the invention as defined by the appended claims.

I claim:

1. In a hood-cushion for automobiles, the combination of a strip of resilient rubber, a strip of metal vulcanized to one face thereof, and outstanding, integral, attachment lugs struck out from said metal strip for securing the strip to a hood-supporting part of an automobile.

2. In a hood cushion for automobiles, the combination of a strip of resilient rubber, a strip of metal vulcanized to one face thereof, and a series of attachment lugs on said metal strip arranged at spaced intervals lengthwise thereof for securing the strip to a hood-supporting part of an automobile.

3. A hood cushion as defined in claim 2 in which the metal strip is coextensive with the surface of the rubber strip to which it is vulcanized.

In witness whereof I have hereunto set my hand this 5th day of March, 1929.

FRED L. HAUSHALTER.